United States Patent
Cuomo et al.

(10) Patent No.: US 7,043,455 B1
(45) Date of Patent: May 9, 2006

(54) METHOD AND APPARATUS FOR SECURING SESSION INFORMATION OF USERS IN A WEB APPLICATION SERVER ENVIRONMENT

(75) Inventors: Gennaro A. Cuomo, Apex, NC (US); Michael L. Fraenkel, Apex, NC (US); Gabriel Garcia Montero, Chapel Hill, NC (US); Nataraj Nagaratnam, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 09/627,373

(22) Filed: Jul. 28, 2000

(51) Int. Cl.
*G06F 19/00* (2006.01)

(52) U.S. Cl. .......................... 705/75; 705/50; 705/55; 705/64; 705/67

(58) Field of Classification Search ............... None
See application file for complete search history.

(56) References Cited

U.S. PATENT DOCUMENTS

| | | | |
|---|---|---|---|
| 5,577,209 A | 11/1996 | Boyle et al. | 395/200.06 |
| 5,588,062 A | 12/1996 | Altschuler et al. | 380/30 |
| 5,627,892 A | 5/1997 | Kauffman | 380/21 |
| 5,689,566 A | 11/1997 | Nguyen | 380/25 |
| 5,875,296 A * | 2/1999 | Shi et al. | 713/202 |
| 5,928,363 A | 7/1999 | Ruvolo | 713/201 |
| 6,052,785 A * | 4/2000 | Lin et al. | 713/201 |
| 6,157,920 A * | 12/2000 | Jakobsson et al. | 705/69 |
| 6,311,269 B1 * | 10/2001 | Luckenbaugh et al. | 713/154 |
| 2002/0138728 A1 * | 9/2002 | Parfenov et al. | 713/170 |

FOREIGN PATENT DOCUMENTS

WO WO 99/56431 11/1999

OTHER PUBLICATIONS

Process for Transparently Locating and Running Applications on Servers, IBM Technical Disclosure Bulletin; vol. 41, No. 01, Jan. 1998; pp. 409-414.

A Process for Selective Routing of Servlet Content to Transcoding Modules; IBM Research Disclosure, Jun. 1999; pp. 889-890.

Design, Implementation and Performance of a Content-Based Switch; Apostolopoulos, G. et al.; Proceedings IEEE Infocom 2000; vol. 3, pp. 1117-1126.

Security for SAS Servers, Perdinson; Proceedings of the Twenty-First Annual SAS Users Group International Conference, SUGI 21, Pt. vol. 1, pp. 1489-1493.

* cited by examiner

*Primary Examiner*—Firmin Backer
(74) *Attorney, Agent, or Firm*—Duke W. Yee; A. Bruce Clay; Wayne P. Barley

(57) ABSTRACT

A method and apparatus for securing hypertext transfer protocol sessions authenticates a user's credentials before creating a session. The present invention then associates the session with the credentials. Subsequent requests are submitted with the session ID and the user credentials to be associated with the session. Therefore, an unauthorized user that has obtained a session ID cannot gain access to sensitive content associated with the session without possessing the valid credentials.

37 Claims, 7 Drawing Sheets

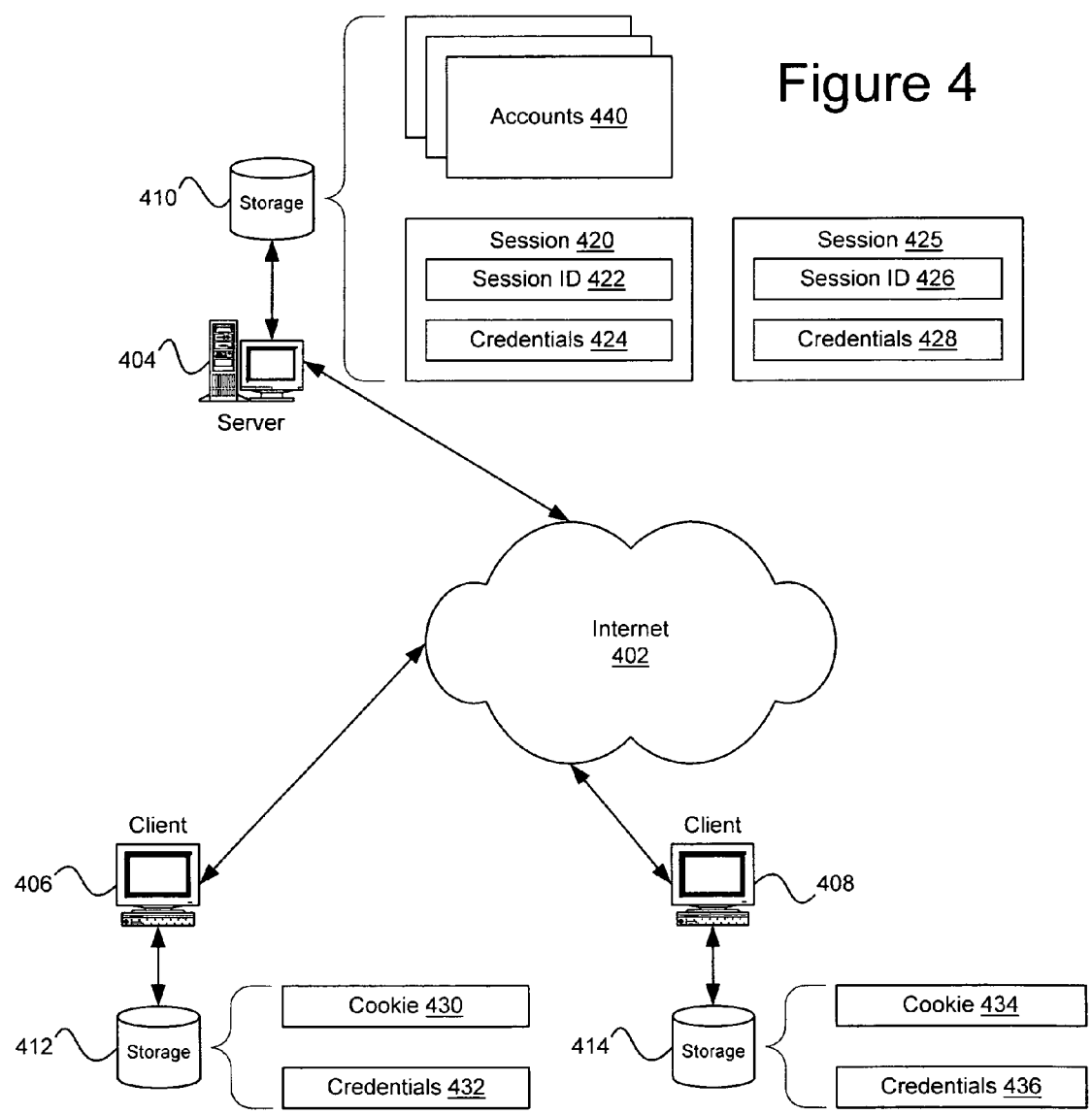

METHOD AND APPARATUS FOR SECURING SESSION INFORMATION OF USERS IN A WEB APPLICATION SERVER ENVIRONMENT

BACKGROUND OF THE INVENTION

1. Technical Field

The present invention relates to an improved data processing system and, in particular, to a method and apparatus for managing sessions in a client/server environment. Still more particularly, the present invention provides a method and apparatus for securing hypertext transfer protocol sessions.

2. Description of Related Art

The worldwide network of computers commonly known as the "Internet" has seen explosive growth in the last several years. Mainly, this growth has been fueled by the introduction and widespread use of so-called "web browsers," which enable simple graphical user interface-based access to network servers, which support documents formatted as so-called "web pages." A browser is a program that is executed on a graphical user interface (GUI) in a client computer. The browser allows a user to seamlessly load documents from a server via the Internet and display them by means of the GUI. These documents are commonly formatted using markup language protocols, such as hypertext markup language (HTML).

The client and the web server typically communicate using hypertext transport protocol (HTTP). However, when a client is accessing sensitive information from a web server, a secure protocol may be used. Hypertext transport protocol secure is the protocol for accessing a secure Web server. Using HTTPS in the uniform resource locator (URL) instead of HTTP directs the message to a secure port number rather than the default Web port number of 80. The session is then managed by a security protocol. Secure sockets layer is the leading security protocol on the Internet. When a session is started in SSL, the browser sends its public key to the server so that the server can securely send a secret key to the browser. The browser and server exchange data via secret key encryption during that session.

However, HTTP is a stateless protocol. Therefore, every request from an HTTP client to an HTTP server is a new request and no state is maintained between requests. Conventionally, HTTP cookies are used to maintain a client-side state whereas sessions are used to manage the state information on the server side. A cookie is data created by a web server that is stored on a client computer. A cookie is used to keep track of a user's patterns and preferences and, with the cooperation of the Web browser, is stored within the client computer. Cookies contain a range of URLs for which they are valid. When the browser encounters those URLs again, it sends the appropriate cookies to the Web server.

A session is used to track the activities of a user. For example, a session may be created to allow a user to add items to a "shopping cart" using a plurality of individual requests. A session may also allow a user to use a web interface to search a database. Web interfaces may also be used to control equipment from remote locations. As web interfaces become increasingly popular, the security of sessions used to manage multiple transactions by individual clients becomes exceedingly important. Normally, a session is created on the server side. To associate a session with a user, a random number, referred to as a session identification (ID), is generated and associated with the user. The session ID is sent back to the browser as a cookie or through a URL rewriting mechanism.

When an HTTP request is received, the server verifies if a session ID is present. If an ID is present, the related session data is retrieved and the request is processed based on the session data. However, the server cannot verify that the user submitting the request is the same user to whom the session ID was originally assigned. Hence, a security loophole exists where an unauthorized user may submit a valid session ID. The session ID may be obtained by repeatedly submitting requests with potential session identifications until access is granted. Alternatively, the ID may be "sniffed" from the network by monitoring data traffic flow. The session ID may be obtained in this manner when a request is transmitted through an unsecure protocol, such as HTTP, as opposed to a secure protocol, such as HTTPS or SSL. In many web application server products, the security of session information is tied only to the randomness of the session ID under the assumption that the bit length of the number is high enough to prevent an unauthorized user from generating the same number in a short period of time. However, the likelihood of hijacking the session ID is not ruled out completely.

Therefore, it would be advantageous to have an improved method and apparatus for securing session information of users in a web application server environment.

SUMMARY OF THE INVENTION

The present invention associates a session with a user's authentication credentials. A session is created using credentials, such as the user's identification and password, a security token, or a digital certificate. Subsequent requests must be submitted with the session ID and the user credentials associated with the session. Thus, the session information is as secure as the server infrastructure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a specific client/server arrangement according to a preferred embodiment of the present invention;

DETAILED DESCRIPTION OF THE PREFERRED EMBODIMENT

Figure 1:
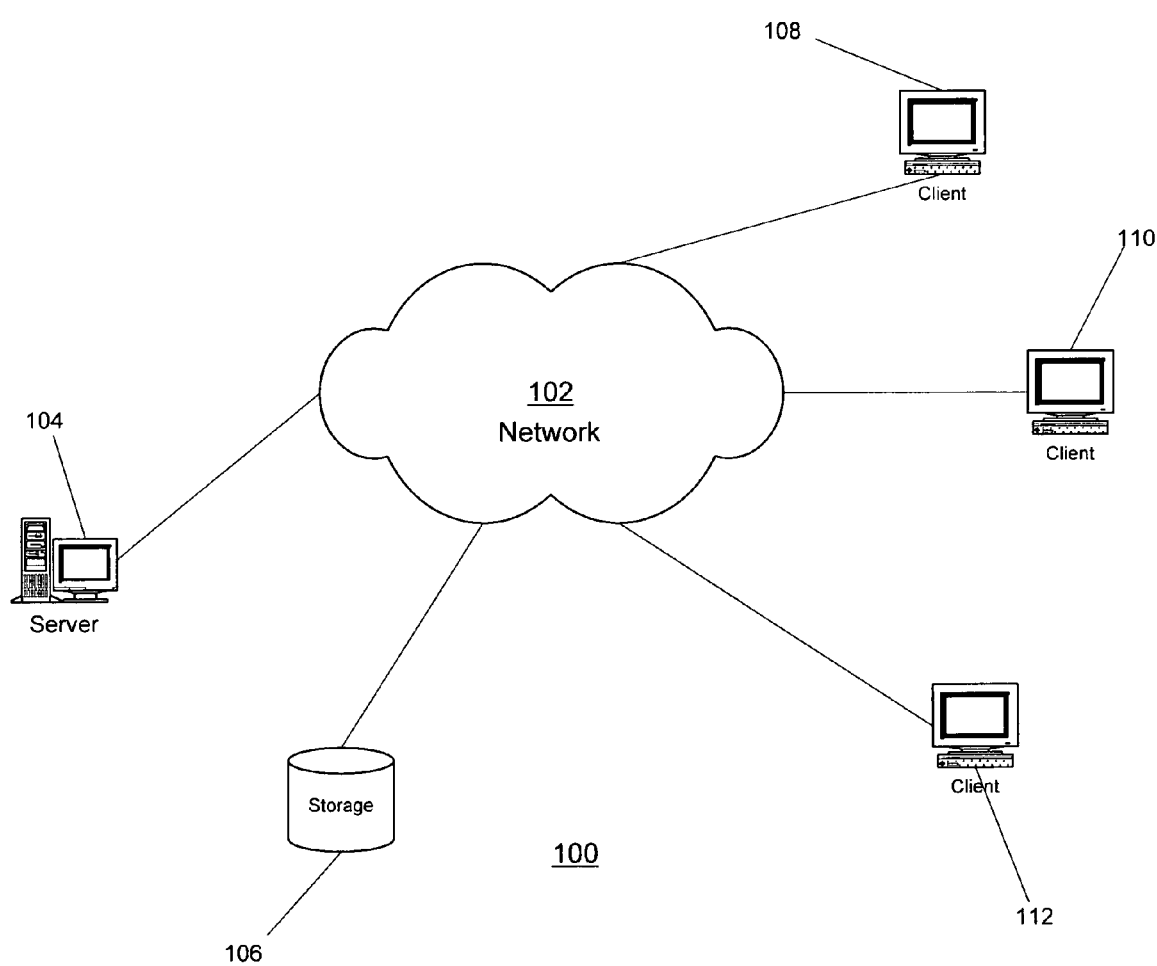
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
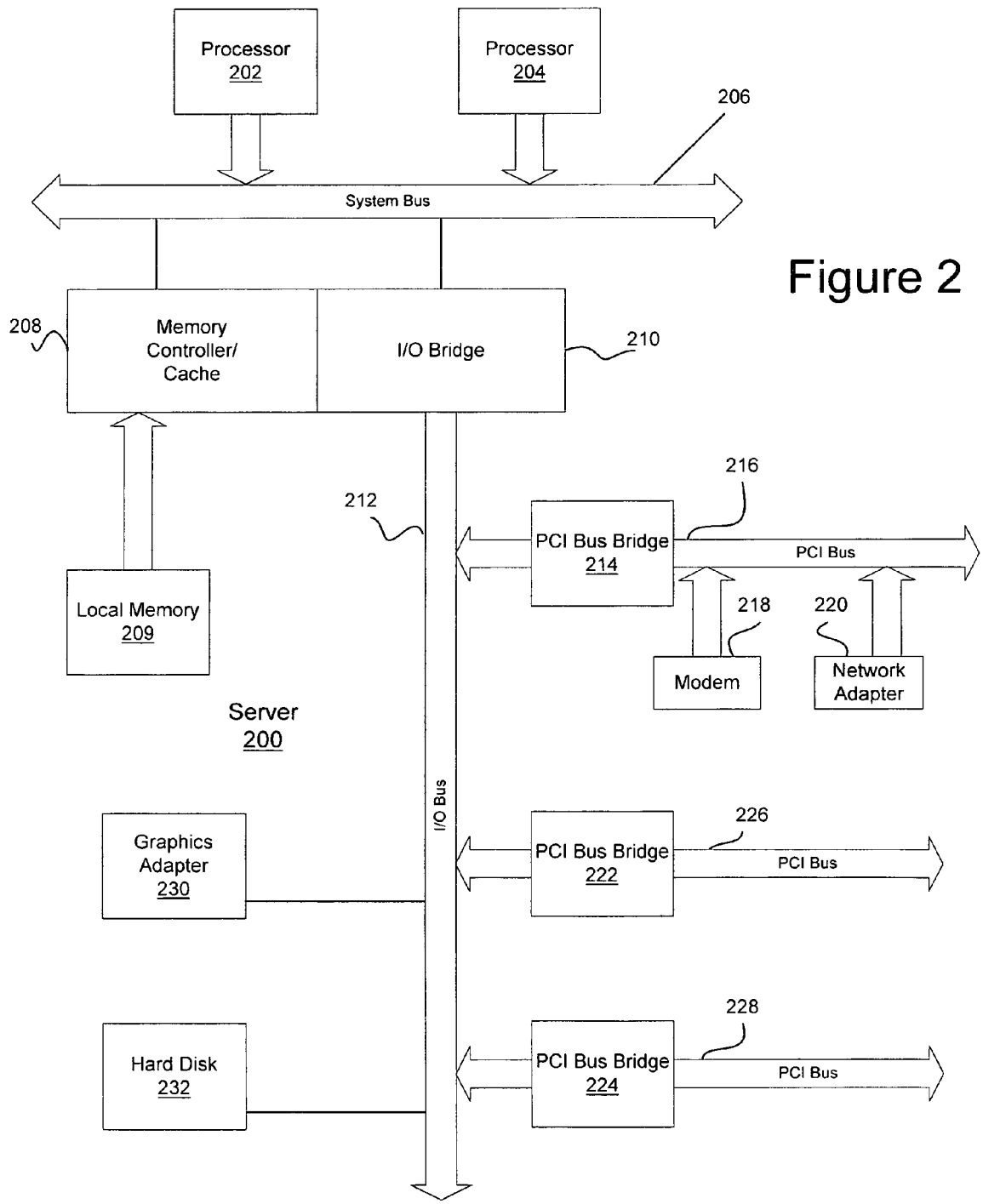
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
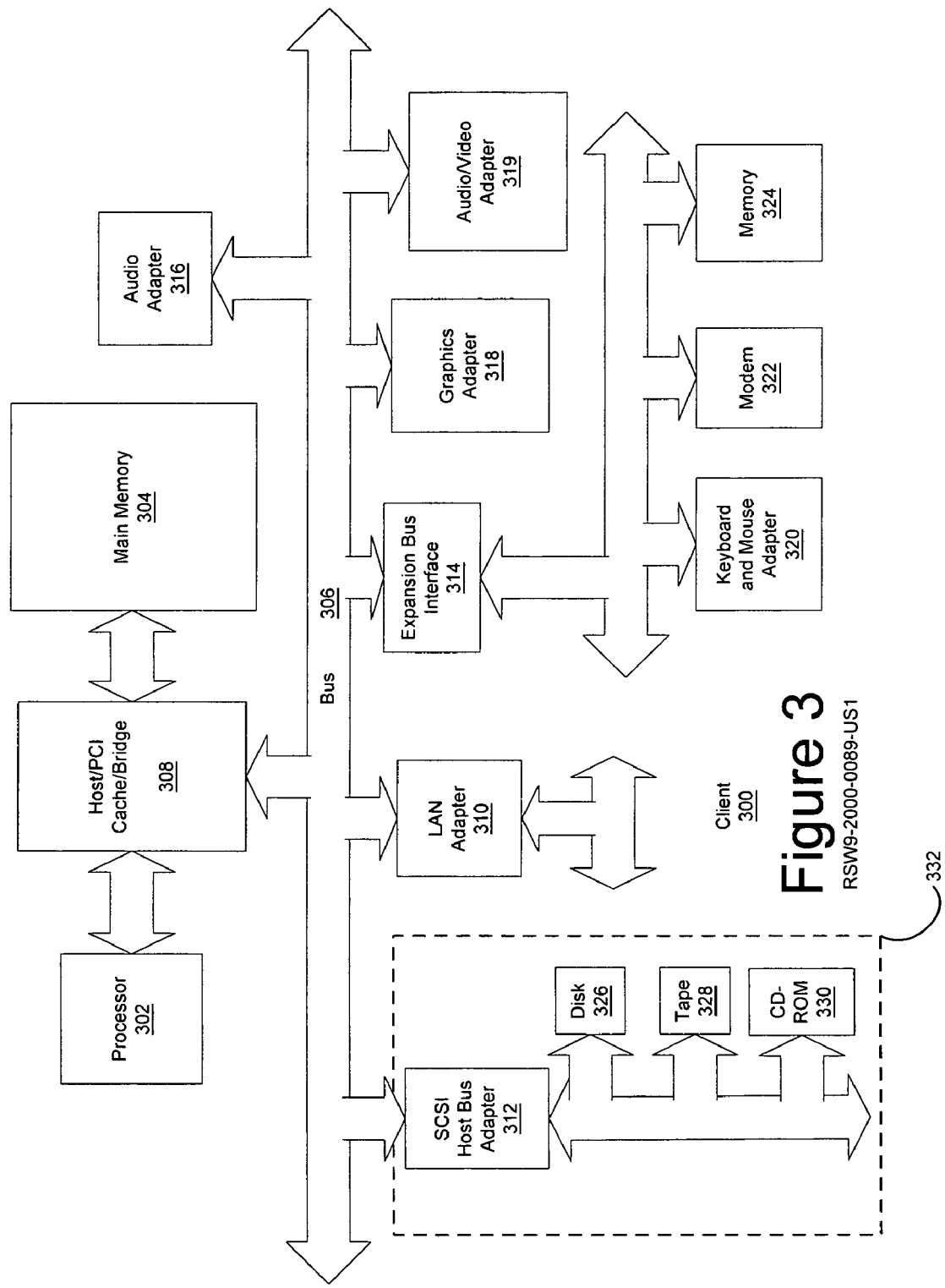
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With reference now to FIG. 4, a specific client/server arrangement is presented according to a preferred embodiment of the present invention. A network, such as Internet 402, connects a server 404, a first client 406, and a second client 408. In the depicted example, the network is the Internet; however, any network that supports HTTP protocol or uses a protocol that may use sessions may be implemented.

Server 404 is connected to storage 410. Similarly, first client 406 is connected to storage 412 and second client 408 is connected to storage 414. When the first client sends a request to the server, session 420 is created and session ID 422 is generated. Session 420 is stored in a data structure referred to as a session object. Once the session is created, the server fulfills the request and session ID 422 is returned, along with the content requested, to the first client as cookie 430, which is stored at the client. The session ID may also be sent to the client using URL rewriting or other known techniques.

According to a preferred embodiment of the present invention, client 406 sends credentials 432 to server 404 with the request. The server then authenticates the credentials and creates session 420 in response to the authentication being successful. The credentials are then stored in association with the session as credentials 424 to be used for subsequent requests in the session. The credentials may be the user's identification and password, a security token issued by the server, or a digital certificate issued by a trusted third party. The user's identification and password may be stored in storage 412, 414 or entered by the user at an input device. A security token or certificate may be stored in storage 412, 414, entered by the user at an input device, or entered by use of a card or bar code. A person of ordinary skill in the art will recognize that other credentials may also be used.

In a similar manner, when second client 408 sends a request to the server, session 425 is created and session ID 426 is generated. Session 425 is stored in a data structure in storage 410. Session ID 426 is returned to the second client as cookie 434, which is stored at the client. The second client sends credentials 436 to the server with the request. The server then authenticates the credentials and creates session 425 in response to the authentication being successful. The credentials are then stored in association with the session as credentials 428 to be used for subsequent requests in the session.

Storage 410 may also have stored therein accounts 440 associated with established users. Sessions may be used to establish an account for the associated user. The server may also use the received credentials to associate an established account with the session. An account may contain bank account information, a user's shopping cart that stores products selected for purchase, an e-mail account, display preferences for a portal or other web site, on-going searches of a database, age verification information for access to restricted material, etc.

In a subsequent request, client 406 submits the request along with the session ID and credentials. Server 404 authenticates the session ID and credentials and continues session 420 if authentication is successful. Encryption may also be used to protect the session ID and credentials from being obtained by malicious users. Also, the request including the session ID and credentials may be sent over HTTPS to avoid session ID and credential hijacking.

Figure 5A:
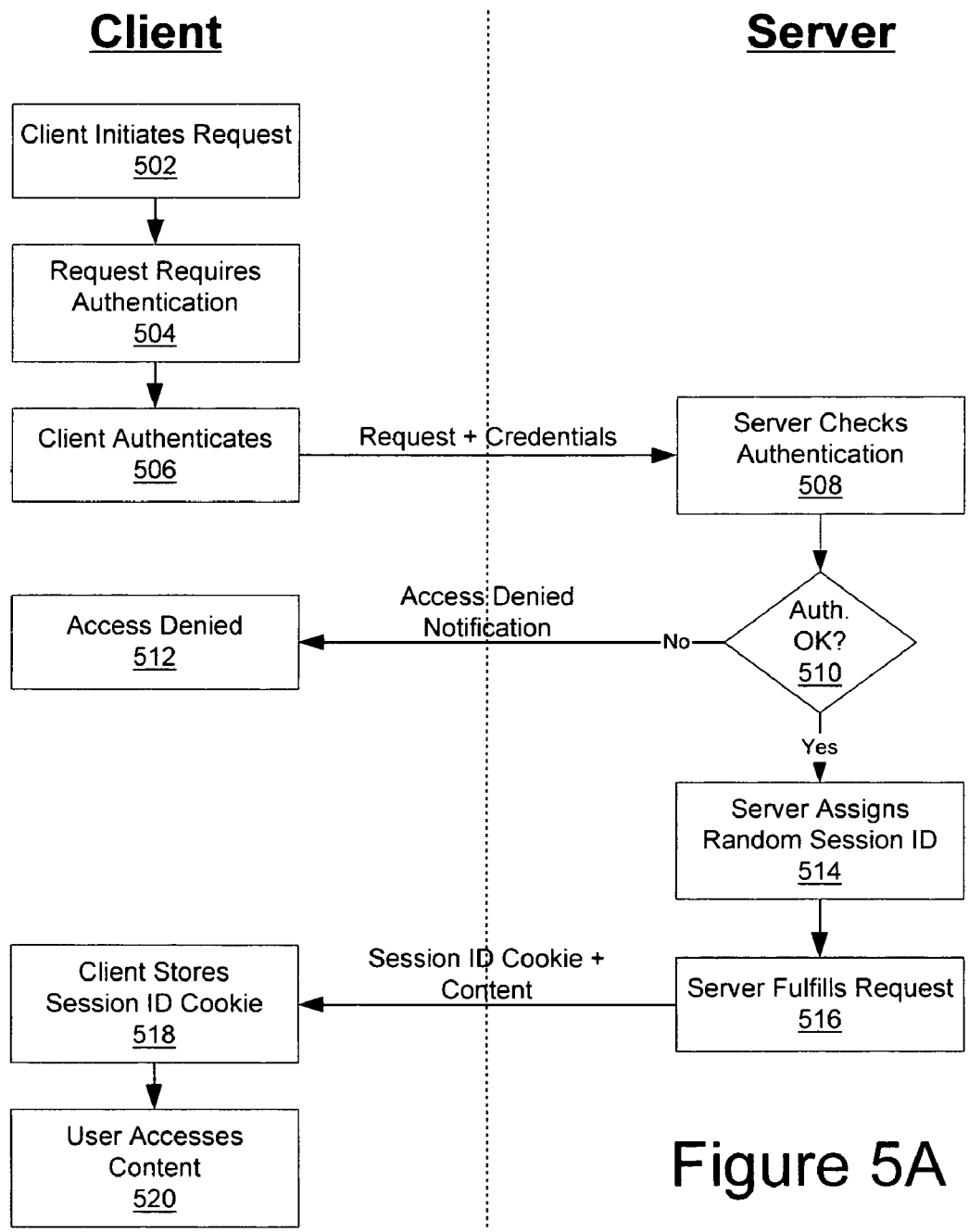
FIG. 5A is a flowchart illustrating the creation of a session in accordance with a preferred embodiment of the present invention.

With reference now to FIG. 5A, a flowchart is shown illustrating the creation of a session in accordance with a preferred embodiment of the present invention. The client initiates a request (step 502), which requires authentication (step 504). The client authenticates (step 506) by supplying credentials, which may be the user's identification and password, a security token issued by the server, or a certificate issued by a trusted third party. The request and credentials are then submitted to the server, which checks authentication (step 508).

A determination is made as to whether authentication is successful (step 510). If authentication is not successful, a notification that access is denied is returned to the client, which presents the notification to the user (step 512). If authentication is successful in step 510, the server generates a random session ID (step 514) and fulfills the request (step 516).

The session ID is returned to the client as a cookie, along with the content associated with the fulfilled request. Thereafter the client stores the session ID cookie (step 518) and the user accesses the content (step 520).

Figure 5B:
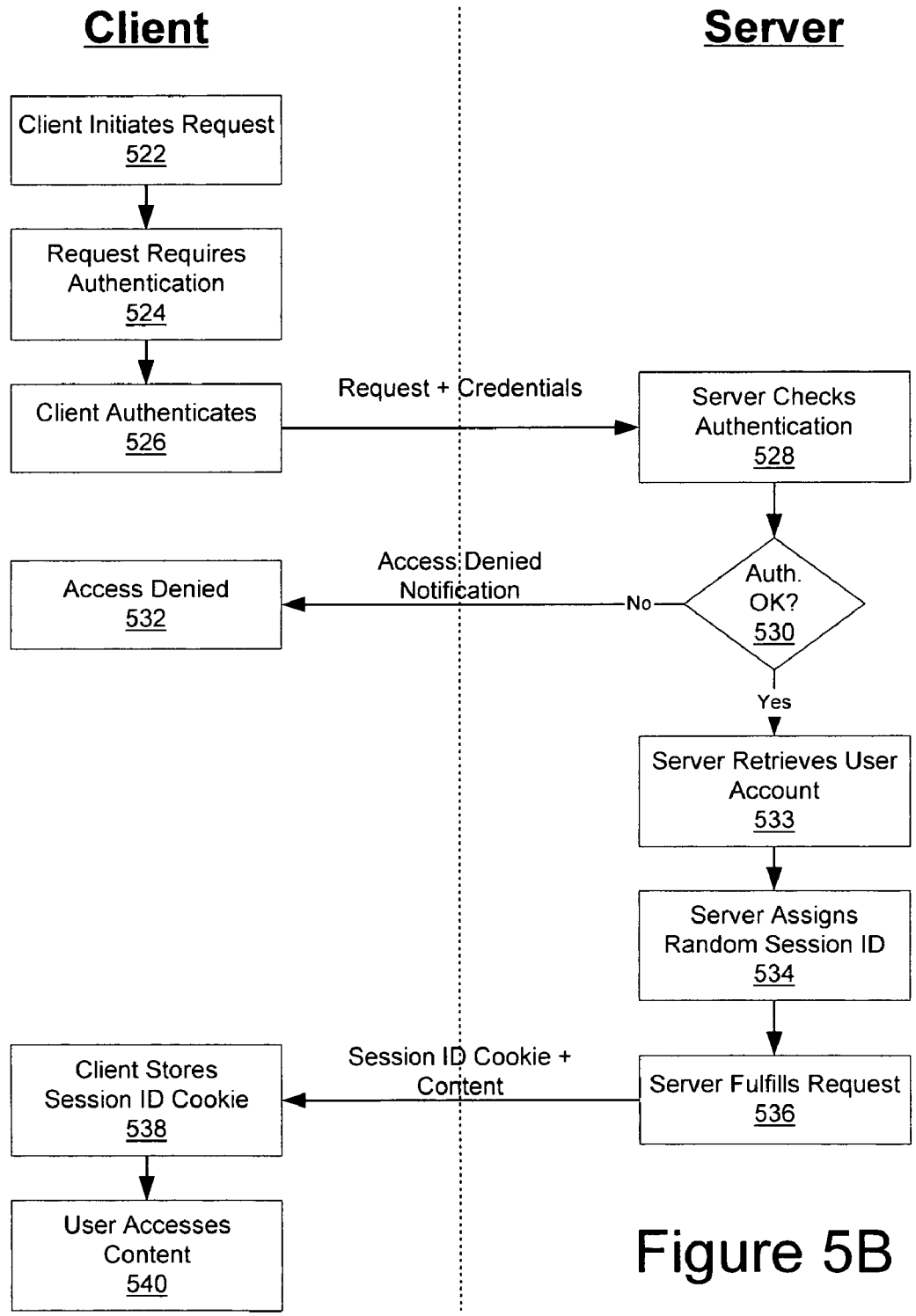
FIG. 5B is a flowchart illustrating the creation of a session for a user with an established account on the server in accordance with a preferred embodiment of the present invention.

Turning now to FIG. 5B, a flowchart is shown illustrating the creation of a session for a user with an established account on the server in accordance with a preferred embodiment of the present invention. The client initiates a request (step 522), which requires authentication (step 524). The client authenticates (step 526) by supplying credentials, which may be the user's identification and password, a security token issued by the server, or a certificate issued by a trusted third party. The request and credentials are then submitted to the server, which checks authentication (step 528).

A determination is made as to whether authentication is successful (step 530). If authentication is not successful, a notification that access is denied is returned to the client, which presents the notification to the user (step 532). If authentication is successful in step 530, the server retrieves a user account associated with the credentials (step 533), generates a random session ID (step 534), and fulfills the request (step 536).

The session ID is returned to the client as a cookie, along with the content associated with the fulfilled request. Thereafter the client stores the session ID cookie (step 538) and the user accesses the content (step 540).

Figure 5C:
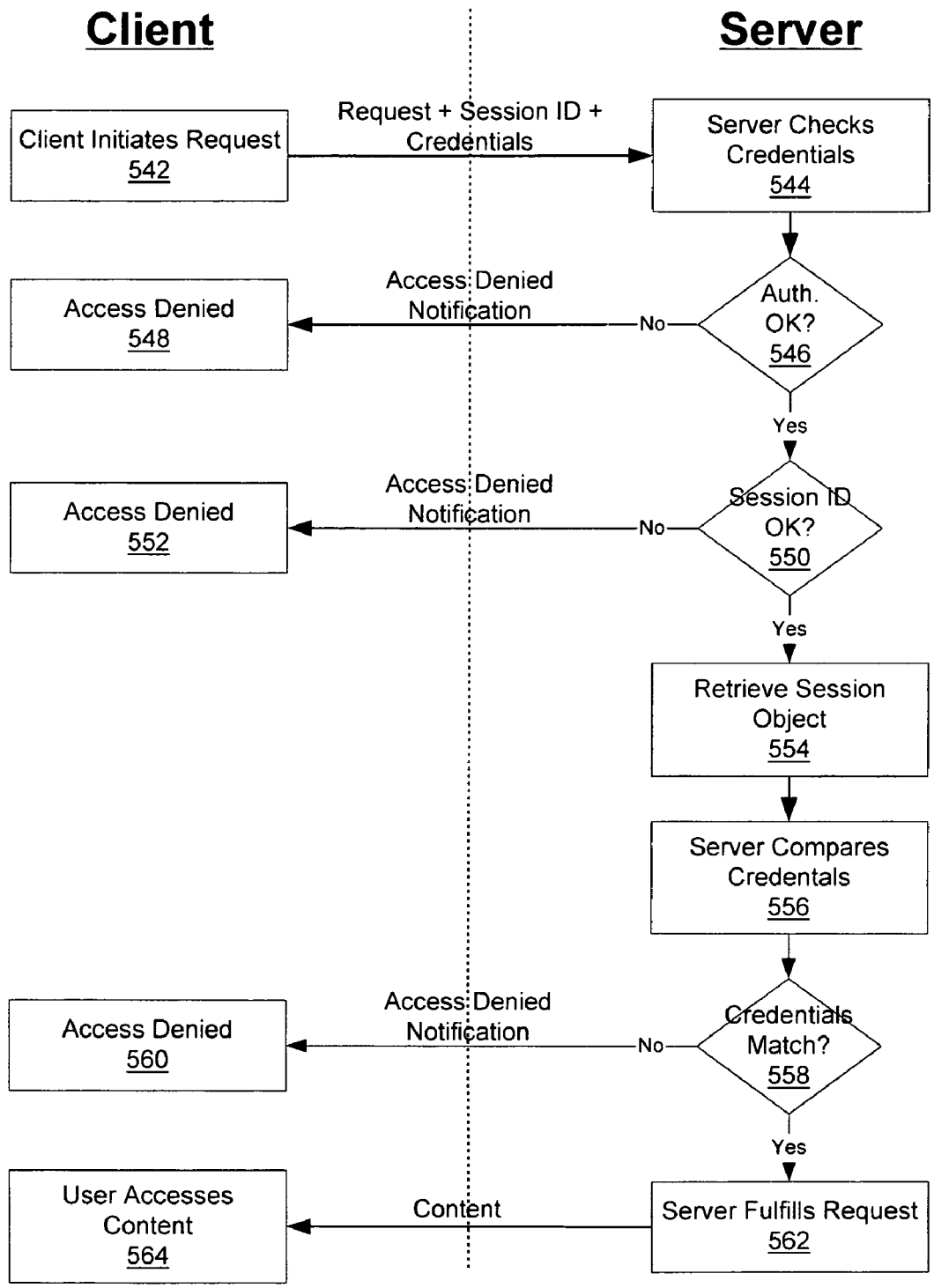
FIG. 5C is a flowchart illustrating the management of a request in an established session according to a preferred embodiment of the present invention.

Turning now to FIG. 5C, a flowchart is shown illustrating the management of a request in an established session according to a preferred embodiment of the present invention. The client initiates a request (step 542) and submits the request along with the session ID and credentials. The server checks the credentials (step 544) and determines whether authorization is successful (step 546). If authorization is not successful, a notification that access is denied is returned to the client, which presents the notification to the user (step 548). If authorization is successful in step 546, a determination is made as to whether the session ID is valid (step 550).

If the session ID is not valid, a notification that access is denied is returned to the client, which presents the notification to the user (step 552). If the session ID is valid in step 550, the server retrieves the session object (step 554), compares the credentials from the request with the credentials in the session object authentication (step 556), and determines whether the credentials match (step 558).

If the credentials do not match, a notification that access is denied is returned to the client, which presents the notification to the user (step 560). If the credentials do match in step 558, the server fulfills the request (step 562) and returns content associated with the fulfilled request to the client. Thereafter, the user accesses the content (step 564).

The present invention authenticates a user's credentials before creating an HTTP session. The present invention then associates the session with the credentials. Subsequent requests must be submitted with the session ID and the user credentials to be associated with the session. Therefore, an unauthorized user that has obtained a session ID by monitoring traffic in the network or by chance cannot gain access to sensitive content associated with the session without also obtaining the credentials. The present invention solves the disadvantages of the prior art by requiring credentials for each request within a session. Thus, the present invention provides increased security against session hijacking.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, HTTP is used as the protocol in the depicted examples, but the present invention may be implemented using other protocols. Also, in the depicted examples, the session ID is sent from the server to the client in a cookie; however, the session ID may be sent by URL rewriting or other known techniques. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing an information request, comprising:
   establishing a session, including authenticating a client based on a presented credential;
   generating a session identification in response to the session being established;
   associating the presented credential with session data;
   sending the session identification to the client;
   receiving a request for information and a credential and the session identification from the client;
   determining whether the session identification is valid;
   determining whether the credential is valid for both the client and the session data;
   sending the information to the client in response to the session identification and the credential being valid.

2. The method of claim 1, wherein the credential is a user name and password, a security token, or a certificate.

3. The method of claim 1, further comprising:
   associating a user account with the session identification in response to the credential being valid.

4. The method of claim 1, wherein the step of generating a session identification comprises generating a random number.

5. The method of claim 1, wherein the step of generating a session identification comprises generating a session identification data structure.

6. The method of claim 5, wherein the session identification data structure is a session identification cookie.

7. The method of claim 5, wherein the session identification data structure is in a rewritten uniform resource locator.

8. The method of claim 1, wherein the request is a hypertext transport protocol request.

9. The method of claim 8, wherein the hypertext transport protocol request is a uniform resource locator.

10. A method in a data processing system for managing an information request, comprising:
    receiving a request for information and a session identification and a first credential from a client;
    determining whether the session identification is valid;
    retrieving a session data structure including a second credential in response to the session identification being valid;
    determining whether the first credential and the second credential match; and
    fulfilling the request for information in response to the first credential and the second credential matching.

11. The method of claim 10, wherein the first credential is a user name and password, a security token, or a certificate.

12. The method of claim 10, wherein the step of generating a session identification comprises generating a random number.

13. The method of claim 10, wherein the step of generating a session identification comprises generating a session identification data structure.

14. The method of claim 13, wherein the session identification data structure is a session identification cookie.

15. The method of claim 13, wherein the session identification data structure is in a rewritten uniform resource locator.

16. The method of claim 10, wherein the request is a hypertext transport protocol request.

17. The method of claim 16, wherein the hypertext transport protocol request is a uniform resource locator.

18. An apparatus for managing an information request, comprising:
- session means for establishing a session, including authenticating a client based on a presented credential;
- generating means for generating a session identification in response to the session being established;
- association means for associating the presented credential with session data;
- first sending means for sending the session identification to the client;
- receipt means for receiving a request for information and a credential and the session identification from the client;
- first determining means for determining whether the session identification is valid;
- second determining means for determining whether the credential is valid for both the client and the session data; and
- second sending means for sending the information to the client in response to the session identification and the credential being valid.

19. The apparatus of claim 18, wherein the credential is a user name and password, a security token, or a certificate.

20. The apparatus of claim 18, further comprising:
- association means for associating a user account with the session identification in response to the session identification being generated.

21. The apparatus of claim 18, wherein the generating means comprises means for generating a random number.

22. The apparatus of claim 18, wherein the generating means comprises means for generating a session identification data structure.

23. The apparatus of claim 22, wherein the session identification data structure is a session identification cookie.

24. The apparatus of claim 22, wherein the session identification data structure is in a rewritten uniform resource locator.

25. The apparatus of claim 18, wherein the request is a hypertext transport protocol request.

26. The apparatus of claim 25, wherein the hypertext transport protocol request is a uniform resource locator.

27. An apparatus for managing an information request, comprising:
- a processor; and
- a memory electrically connected to the processor, the memory having stored therein a program to be executed on the processor for performing:
  - receiving a request for information and a session identification and a first credential from a client;
  - determining whether the session identification is valid;
  - retrieving a session data structure including a second credential in response to the session identification being valid;
  - determining whether the first credential and the second credential match; and
  - fulfilling the request for information in response to the first credential and the second credential matching.

28. The apparatus of claim 27, wherein the first credential is a user name and password, a security token, or a certificate.

29. The apparatus of claim 27, wherein the step of generating a session identification comprises generating a random number.

30. The apparatus of claim 27, wherein the step of generating a session identification comprises generating a session identification data structure.

31. The apparatus of claim 30, wherein the session identification data structure is a session identification cookie.

32. The apparatus of claim 30, wherein the session identification data structure is in a rewritten uniform resource locator.

33. The apparatus of claim 27, wherein the request is a hypertext transport protocol request.

34. The apparatus of claim 33, wherein the hypertext transport protocol request is a uniform locator.

35. A computer program product, in a computer readable medium, for managing an information request, comprising:
- instructions for establishing a session, including authenticating a client based on a presented credential;
- instructions for generating a session identification in response to the session being established;
- instructions for associating the presented credential with session data;
- instructions for sending the session identification to the client;
- instructions for receiving a request for information and a credential and the session identification from a client;
- instructions for determining whether the session identification is valid;
- instructions for determining whether the credential is valid for both the client and the session data;
- instructions for sending the information to the client in response to the session identification and the credential being valid.

36. A computer program product, in a computer readable medium, for managing an information request, comprising:
- instructions for receiving a request for information and a session identification and a first credential from a client;
- instructions for determining whether the session identification is valid;
- instructions for retrieving a session data structure including a second credential in response to the session identification being valid;
- instructions for determining whether the first credential and the second credential match; and
- instructions for fulfilling the request for information in response to the first credential and the second credential matching.

37. A method in a data processing system for managing an information request, comprising:
- authenticating a client based on a presented credential;
- generating a session identification in response to the client being authenticated;
- associating the presented credential with session data;
- sending the session identification to the client;
- receiving a request for information and a credential and the session identification from the client;
- determining whether the session identification is valid;
- determining whether the credential is valid for both the client and the session data; and
- sending the information to the client in response to the session identification and the credential being valid.

* * * * *

UNITED STATES PATENT AND TRADEMARK OFFICE
CERTIFICATE OF CORRECTION

| | | |
|---|---|---|
| PATENT NO. | : 7,043,455 B1 | Page 1 of 1 |
| APPLICATION NO. | : 09/627373 | |
| DATED | : May 9, 2006 | |
| INVENTOR(S) | : Cuomo et al. | |

It is certified that error appears in the above-identified patent and that said Letters Patent is hereby corrected as shown below:

On the title page:
(74) Attorney, Agent, or Firm: delete "Wayne P. Barley" and insert --Wayne P. Bailey--.

Col. 10, line 13: after "uniform" insert --resource--.

Signed and Sealed this

Fifth Day of December, 2006

JON W. DUDAS
*Director of the United States Patent and Trademark Office*